US009389978B2

(12) United States Patent
Barker et al.

(10) Patent No.: US 9,389,978 B2
(45) Date of Patent: Jul. 12, 2016

(54) AUTOMATED OPERATING SYSTEM TEST FRAMEWORK

(71) Applicant: International Business Machines Corporation, Armonk, NY (US)

(72) Inventors: John R. Barker, Manchester (GB); Ian James McCloy, Stockport (GB); Daniel Gregory Mounty, Manchester (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/551,695

(22) Filed: Nov. 24, 2014

(65) Prior Publication Data

US 2015/0082095 A1  Mar. 19, 2015

Related U.S. Application Data

(63) Continuation of application No. 13/225,205, filed on Sep. 2, 2011, now Pat. No. 8,898,522.

(30) Foreign Application Priority Data

Sep. 9, 2010 (EP) .................................... 10176014

(51) Int. Cl.
G06F 11/00 (2006.01)
G06F 11/263 (2006.01)
G06F 11/36 (2006.01)

(52) U.S. Cl.
CPC ............ G06F 11/263 (2013.01); G06F 11/368 (2013.01); G06F 11/3664 (2013.01)

(58) Field of Classification Search
CPC .. G06F 11/263; G06F 11/4664; G06F 11/368

USPC .................. 714/25–28, 33; 717/124, 134
See application file for complete search history.

(56) References Cited

U.S. PATENT DOCUMENTS

| 4,606,024 | A  | 8/1986  | Glass et al.    |
|-----------|----|---------|-----------------|
| 6,862,565 | B1 | 3/2005  | Zheng           |
| 6,901,583 | B1 | 5/2005  | Park            |
| 7,165,074 | B2 | 1/2007  | Avvari et al.   |
| 7,490,319 | B2 | 2/2009  | Blackwell et al.|
| 8,146,058 | B2 | 3/2012  | Sarkar et al.   |
| 8,266,593 | B2 | 9/2012  | Narayanan et al.|

(Continued)

FOREIGN PATENT DOCUMENTS

EP  1559012 B1  4/2005
TW  095133350    9/2006

*Primary Examiner* — Joshua P Lottich
(74) *Attorney, Agent, or Firm* — Thomas E. Tyson; Gregory K. Goshorn; Greg Goshorn, P.C.

(57) ABSTRACT

Techniques for automating testing of a first computing system comprises identifying a plurality of system interface elements of a second computing system; determining an untested state at the first computing system of one of the identified plurality of system interface elements; determining the existence of any dependency of the one of the identified plurality of system interface elements upon another of the identified plurality of system interface elements; responsive to a finding of no the dependency, seeking in a repository a system interface element test corresponding to the one of the identified plurality of system interface elements and having an expected output according to a structure of the second computing system; and executing the system interface element test at the first computing system.

18 Claims, 2 Drawing Sheets

(56) References Cited

U.S. PATENT DOCUMENTS

| | | |
|---|---|---|
| 8,276,123 B1 | 9/2012 | Deng et al. |
| 2005/0165823 A1 | 7/2005 | Ondrusek et al. |
| 2007/0076616 A1 | 4/2007 | Ngo et al. |
| 2007/0234293 A1 | 10/2007 | Noller et al. |
| 2007/0240116 A1 | 10/2007 | Bangel et al. |
| 2009/0187894 A1 | 7/2009 | Bell et al. |
| 2012/0030654 A1 | 2/2012 | Park et al. |
| 2012/0079456 A1 | 3/2012 | Kannan et al. |

AUTOMATED OPERATING SYSTEM TEST FRAMEWORK

CROSS-REFERENCES TO RELATED APPLICATIONS

The present application is a continuation and claims the benefit of the filing date of an application entitled, "Automated Operating System Test Framework" Ser. No. 13/225,205, filed Sep. 2, 2011, now U.S. Pat. No. 8,898,522, issued Nov. 25, 2014, assigned to the assignee of the present application, and herein incorporated by reference.

BACKGROUND

The present invention relates to automated testing of computing systems and in particular to automated testing of the supported interface elements of computing systems.

It is well-known in the art to have various testing tools and test harnesses to test computing systems. One area of testing that requires particular attention in this respect is in testing systems that are intended to behave externally as if they were other systems for example, testing systems designed to emulate or virtualize other systems or system architectures while having different internal structures, sequences of instructions and operating characteristics. Another example is the testing of a modified or enhanced system to determine that it still supports all the functions and behavioural characteristics of a predecessor system (sometimes known as "regression testing"). When the operator command-line interfaces of operating systems need to be tested after enhancement, or when an operating system needs to have its command-line interface characteristics reproduced on a different architecture, a large amount of somewhat repetitive testing is required, leading to potential problems of lack of adequate coverage and human errors caused by the nature of the testing task.

SUMMARY

The claimed subject matter accordingly provides, in a first aspect, techniques for automating testing of a first computing system comprising: identifying a plurality of system interface elements of a second computing system; determining an untested state at said first computing system of one of said identified plurality of system interface elements; determining the existence of any dependency of said one of said identified plurality of system interface elements upon another of said identified plurality of system interface elements; responsive to a finding of no said dependency, seeking in a repository a system interface element test corresponding to said one of said identified plurality of system interface elements and having an expected output according to a structure of said second computing system; and executing said system interface element test at said first computing system.

The techniques may further comprise responsive to a finding of a said dependency, seeking in said repository a further system interface element test corresponding to said another of said identified plurality of system interface elements; and executing said further system interface element test at said first computing system. The techniques may further comprise responsive to a failure of said seeking to find a said system interface element test or a said further system interface element test, creating a new test corresponding to said one of said identified plurality of system interface elements; executing said new test at said second computing system; and storing in said repository said new test and an expected output corresponding to an output of executing said new test at said second computing system.

The techniques may further comprise comparing an output of executing said system interface element test or said new test at said first computing system with said expected output in said repository; and responsive to a mismatch between said output of said executing and said expected output, eliciting a user input. Preferably, said user input selectively masks a portion of said output of said test. Preferably, said first computing system is arranged to emulate operation of said second computing system.

In a second aspect, there is provided a system for automating testing of a first computing system comprising: an identifying component for identifying a plurality of system interface elements of a second computing system; a determining component for determining an untested state at said first computing system of one of said identified plurality of system interface elements; a determining component for determining the existence of any dependency of said one of said identified plurality of system interface elements upon another of said identified plurality of system interface elements; a seeking component responsive to a finding of no said dependency for seeking in a repository a system interface element test corresponding to said one of said identified plurality of system interface elements and having an expected output according to a structure of said second computing system; and an executing component for executing said system interface element test at said first computing system.

The system may further comprise said seeking component further responsive to a finding of a said dependency, seeking in said repository a further system interface element test corresponding to said another of said identified plurality of system interface elements; and said executing component flintier adapted for executing said further system interface element test at said first computing system.

The system may further comprise a creator component, responsive to a failure of said seeking to find a said system interface element test or a said further system interface element test, for creating a new test corresponding to said one of said identified plurality of system interface elements; said executing component further adapted for executing said new test at said second computing system; and a storing component for storing in said repository said new test and an expected output corresponding to an output of executing said new test at said second computing system.

The system may further comprise a comparator component for comparing an output of said executing said system interface element test or said new test at said first computing system with said expected output in said repository; and an input eliciting component responsive to a mismatch between said output of said executing and said expected output, eliciting a user input. Preferably, said user input selectively masks a portion of said output of said test.

Preferably, said first computing system is arranged to emulate operation of said second computing system.

In a third aspect, there is provided a computer program comprising computer program code to, when loaded into a computer system and executed thereon, cause said computer system to perform the method according to the first aspect.

In an exemplary embodiment, the present invention thus provides a system, method and computer program for the systematic execution of every individual command of the operating system in a manner that respects the command dependencies and makes provision for multiple concurrent test writers, real-time feedback, multiple platforms, and test portability.

BRIEF DESCRIPTION OF THE DRAWINGS

An embodiment of the present invention will now be described by way of example only, with reference to the accompanying drawings, in which.

DETAILED DESCRIPTION

Figure 1:
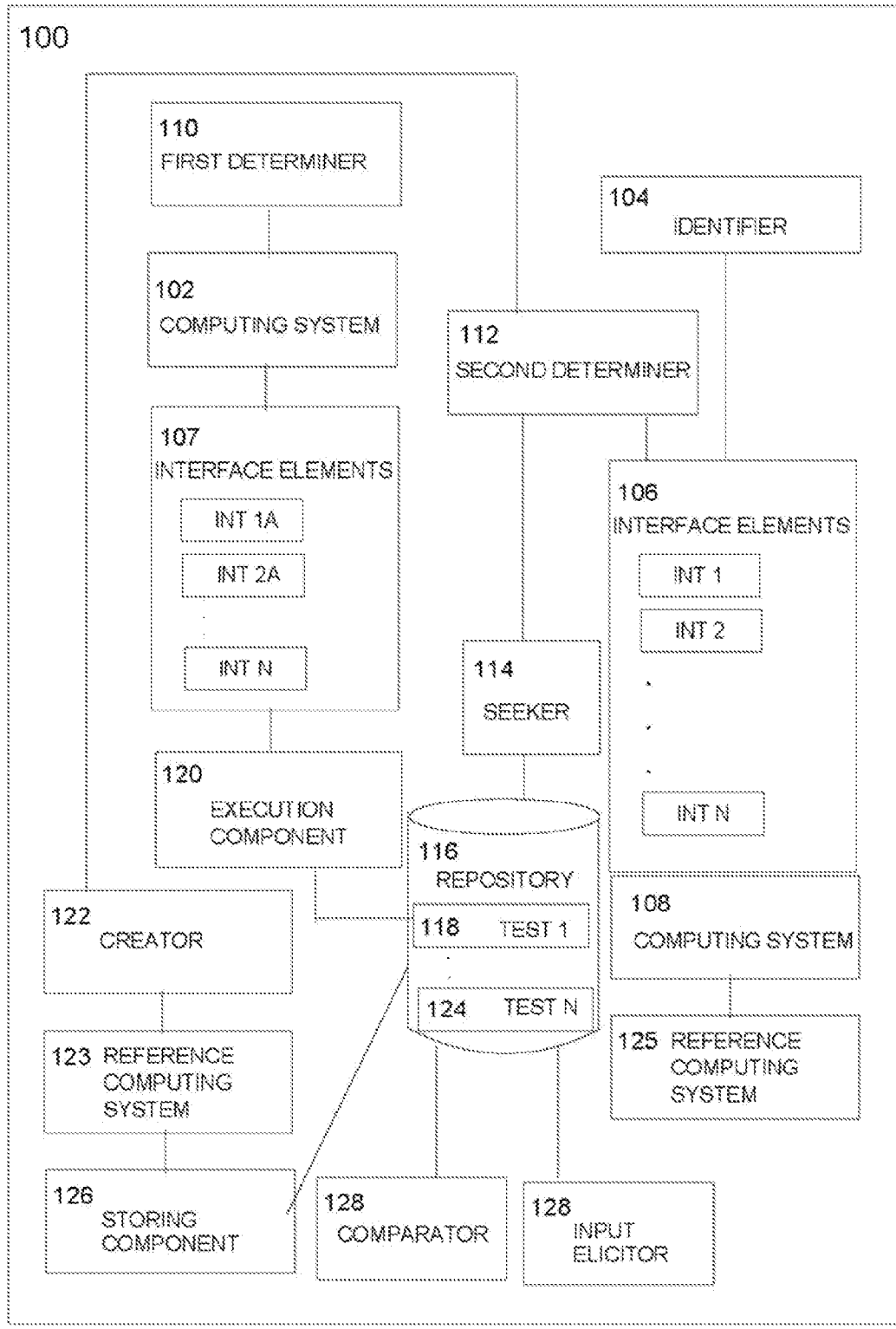
FIG. 1 shows a system according to at preferred embodiment of the claimed subject matter.

As described in the Background section above, the requirement for exhaustive and dependency-respecting automated testing of the underlying operating system binaries represented at an interface layer by a complex command set is difficult to meet.

The exemplary system according to the preferred embodiment can generically be used to test any operating system, in particular any Unix-like operating system, independently of the hardware which is used to execute it, whether this is real or virtual hardware. The system has a web based front end which is comprised of an interactive test development interface, a database which stores the tests and associated results, and a back-end which interacts remotely over various communication methods (SSH, NFS, network socket, FTP) to a remote test machine to execute the tests and retrieve the results. The tests are written as standard operating system commands in the web interface and the system generates one or more shell scripts from the commands; these are transferred over to the test machine and executed. The test writers do not need to have programming experience as they only need to input system commands. These tests can be reused and shared over many operating systems as Unix-like operating systems often share many of the same core commands. The key part of the system is that it scales to many concurrent users writing and executing tests and allows for rapid test development as the test writers automatically get feedback on their tests in seconds.

Automated testing systems in general are known, but none address the specific problems described above. For example, consider the testing of cross-platform application translators. In one exemplary case, such a cross platform translator allows an application written for one operating system/CPU pair to run on a completely different operating system/CPU pair. The technology requires the delivery of a bundled operating system which runs alongside the host operating system and a cross-platform application translator which acts as a bridge between the two. In such an environment it is desirable to automatically test the bundled operating system to ensure that, with the given translation layer, the operating system binaries underlying the command set all operate in exactly the same manner as they do on a reference platform.

In testing the underlying operating system binaries, it will be understood by one of skill in the art that there is a need to respect any dependency relations among the binaries. For example, the testing of a binary that executes in response to a command to perform a manipulation on a file in a directory is dependent upon the binaries that create directories and populate them with files. The file manipulation binary cannot thus be tested until the directory and file making binaries have been exercised.

Thus, a requirement for exhaustive and dependency-respecting automated testing of the underlying binaries represented at an interface layer by a complex command set is difficult to satisfy. It is thus desirable to address these shortcomings of known testing systems.

Turning now to FIG. 1, there is shown a system according to a preferred embodiment of the present invention. FIG. 1 shows a system 100 for automating testing of a first computing system 102 and comprising an identifying component 104 for identifying a plurality of system interface elements 106 of a second computing system 108 and, independently, a plurality of system interface elements 107 of first computing system 102. The intersection of system interface elements 106 and system interface elements 107 is targeted for test development.

It will be clear to one of ordinary skill in the art that the system described here is simplified and that in reality the embodiments of the present invention will encompass pluralities of computing systems 102, 108.

The system 100 comprises a first determining component 110 for determining an untested state at the first computing system 102 of one of the plurality of system interface elements 106 and a second determining component 112 for determining from metadata provided by creator 122 the existence of any dependency of the one of the plurality of system interface elements 106 upon another of the plurality of system interface elements 106. The system 100 also comprises a seeking component 114 responsive to a finding of no dependency for seeking in a repository 116 a system interface element test 118 corresponding to the one of the plurality of system interface elements 106 and having an expected output according to a structure of the second computing system 108; and an executing component 120 for executing the system interface element test 118 at the first computing system 102.

In the preferred embodiment, the first computing system 102 is arranged to emulate operation of the second computing system 108.

In order to start testing an operating system/CPU combination according to a most preferred arrangement three machines are typically required:

A. One server which is typically an x86 Linux machine running a database and a webserver (typically mysql and apache)—this system holds repository 116;

B. One client (the client is essentially the remote tested machine running the combination which it is intended to test and typically running SSH)—this system corresponds to the first computing system 102; and C. One reference platform, which is where the commands are executed to establish a basis for comparison—this system corresponds to the second computing system 108.

The test machine is set up with as many different configuration options as are available to the reference platform. This allows the tests to be as machine-independent as possible, which is essential for test reliability, portability and quality.

Once the system is started up, it communicates with the database and starts executing tests of the selected project which do not yet have any results recorded. The system automatically determines the architecture and operating system of the remote test machine which it has been directed to use and subsequently only attempts to execute tests which are associated with that architecture/operating system combination.

The system 100 may also comprise a creator component 122, responsive to a failure of the seeking to find a system interface element test 118 or a further system interface element test 124, for creating a new test at first reference computing system 123 corresponding to the one of the plurality of system interface elements 106; the executing component 120 being adapted for executing the new test at the second computing system 108; and a storing component 126 for storing in the repository 116 the new test and an expected output corresponding to an output of the executing the new test at the second computing system 108, with reference to second reference computing system 125. Creator 122 is provided with realtime feedback on the execution state and results of tests under development.

Thus, if there are no tests in the database for the combination on the remote machine, the system automatically scan the remote machine for binary files, 'bins', and populates the database locally with details about the bins which need tests to be written for them and automatically record a description of each bin if the operating system is able to provide it.

This causes the new combination to show up in the web interface and its child binaries are flagged as needing tests writing for them. The test writer then reads the operating system documentation and chooses a binary to test.

In the system 100 of the disclosed embodiment, the seeker component 114 is, responsive to a finding of a dependency, adapted for seeking in the repository a further system interface element test 124 corresponding to the another of the plurality of system interface elements 106; and the executing component 120 is further adapted for executing the further system interface element test at the first computing system 102.

Thus, initially the first few binaries are arbitrarily chosen; later, once tests start to develop, a natural priority on bins is established. The way this is done is that the test writer includes a list of dependencies: other system commands, which are used in the testing of the binary they are currently writing tests for. System commands on which other tests are dependent are deemed to be of higher priority—they tend to be the most commonly used commands on the system. This priority list is dynamically generated as more tests are written. The more dependants a bin has, the higher the priority is put on testing it.

The test writer then executes the binary which they are testing with associated options on a reference platform and inputs the command and the expected output into the system. The system then automatically runs the command on the test machine and reports back if the output matches what was expected. If the test matches the exact output, it is deemed a pass and is indicated, as such. If the test takes longer then a standard time-out of, for example, 10 seconds, it is requested to run again with a 20 second timeout and is set for lower priority. This allows for rapid feedback as the quickest running tests are run first. If the second time the test is run, it still does not complete execution in 20 seconds, its time-out is again raised, this time to 40 seconds. If the third time it doesn't finish in 40 seconds, the test is marked for manual inspection. If the test is run on the remote test machine and the output does not match that of the reference platform it is determined to be a failure.

The system may further comprise a comparator component 128 for comparing an output of the executing the system interface element test or the new test at the first computing system 102 with the expected output in the repository 116; and an input eliciting component 130 responsive to as mismatch between the output of the executing and the expected output, for eliciting a user input. The user input may be to selectively mask a portion of the output of the test.

The system records the difference in output and this is displayed clearly in the web interface. In a number of cases the output of a test will vary from machine to machine because of things such as unique hostnames and IP addresses, in which case the test writer would identify these in the feedback from the system and provide as tag in the output. These tags are as set of standard objects which are known to cause issues such as particular hostnames, usernames, Internet Protocol (IP) addresses, dates, times, and the like. Users also have the option to write their own regular expressions if one of the existing tags does not match what they are attempting to mask in the output.

As each test execution completes, the system evaluates tests which need to run, chooses one and executes it; this whole process is normally only a few seconds and is as near real-time as can be expected. If the number of outstanding tests becomes too large, additional machines can be brought on-line to spread the workload as required. Additional locking mechanisms can be used to label a test as in-testing in the database to prevent the same test running concurrently on multiple machines.

To ensure quality test writing, the test team will periodically review existing tests in the system and mark a vote in the system if they believe the test to be well written and complete. If the test receives negative votes it is marked in the main list of binaries as needing additional work done. All the tests are considered incomplete unless they have sufficient positive votes for them. Tests which have multiple negative votes are deemed higher priority for review and correction.

Figure 2:
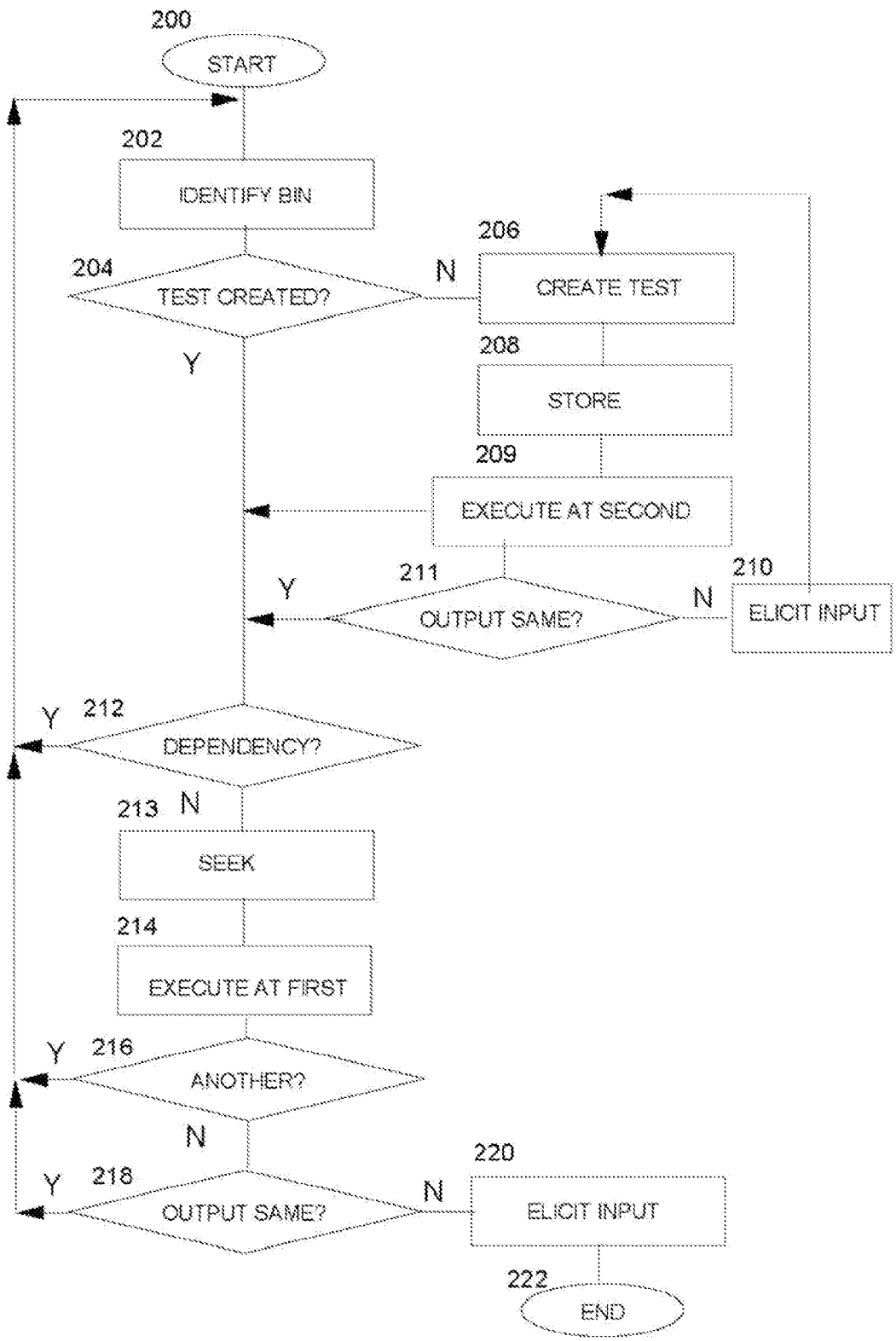
FIG. 2 shows techniques according to a preferred embodiment of the claimed subject matter.

FIG. 2 shows procedure for automating testing of a first computing system comprising, after START block 200, identifying 202 one of a plurality of system interface elements of a second computing system which has an untested state at the first computing system; determining 204 the existence of a test and at block 212 determining the existence of any dependency of the one of the plurality of system interface elements upon another of the plurality of system interface elements: responsive to a finding of no dependency, seeking 213 in a repository a system interface element test corresponding to the one of the plurality of system interlace elements and having an expected output according to a structure of the second computing system; and executing 214 the system interface element test at the first computing system. If another test remains to be performed, as determined at block 216, the system returns to block 202.

Responsive to a finding of a dependency, the procedure returns to block 202.

The procedure may also comprise, responsive to a failure of block 204 to find a system interface element test or a further system interface element test, creating 206 a new test corresponding to the one of the plurality of system interface elements; storing 208 in the repository the new test and an expected output, and executing 209 the new test at the second computing system. A comparison is performed at block. 211 between the output of block 209 with an expected output, and on a mismatch, input is elicited at block 210, after which the process returns to create test block 206. If there is a match at test block 211, the process rejoins the main process and proceeds to test block 212.

The procedure may further comprise comparing 218 an output of the executing 214 the system interface element test or the new test at the first computing system with the expected output in the repository; and responsive to a mismatch between the output of the executing 214 and the expected output, eliciting 220 a user input. The process completes at END block 222.

It will be readily appreciated by one of ordinary skill hi the art that various further modifications to the embodiment described above will be apparent to a person of ordinary skill in the art.

It will be clear to one skilled in the art that the procedures of the claimed subject ratter may suitably be embodied in a logic apparatus comprising logic means to perform the method, and that such logic means may comprise hardware components or firmware components.

It will be appreciated that the procedure described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, is a modem or other interface device, over either a tangible medium, including but not limited to optical or analogue communications lines, or intangibly using, wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including, but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

We claim:

1. A method of automating testing of a first computing system comprising:
    identifying a plurality of system interface elements of a second computing system;
    determining an untested state at said first computing system of one of said identified plurality of system interface elements;
    determining there is no dependency of said one of said identified plurality of system interface elements upon any other of said identified plurality of system interface elements;
    in response to determining that there is no dependency, seeking in a repository a system interface element test corresponding to said one of said identified plurality of system interface elements and having an expected output according to a structure of said second computing system; and
    executing said system interface element test at said first computing system.

2. The method of claim 1, further comprising:
    determining there is a dependency and, in response, seeking in said repository a further system interface element test corresponding to another of said identified plurality of system interface elements; and
    executing said further system interface element test at said first computing system.

3. The method of claim 1, further comprising:
    responsive to a failure of said seeking to find a said system interface element test, creating a new test corresponding to said one of said identified plurality of system interface elements;
    executing said new test at said second computing system; and
    storing in said repository said new test and an expected output corresponding to an output of said executing said new test at said second computing system.

4. The method of claim 1, further comprising:
    comparing an output of said executing said system interface element test at said first computing system with said expected output in said repository; and
    responsive to a mismatch between said output of said executing and said expected output, eliciting a user input.

5. The method of claim 4, wherein said user input selectively masks a portion of said output of said test.

6. The method of claim 1 wherein said first computing system is arranged to emulate operation of said second computing system.

7. A system for automating testing of a first computing system comprising:
    a plurality of processors; and
    logic, stored in a non-transitory computer-readable storage medium and executed on the plurality of processors, comprising:
        an identifying component identifying a plurality of system interface elements of a second computing system;
        a first determining component determining an untested state at said first computing system of one of said identified plurality of system interface elements;
        a second determining component determining there is no dependency of said one of said identified plurality of system interface elements upon any other of said identified plurality of system interface elements;
        a seeking component, responsive to a determining of no dependency, seeking in a repository a system interface element test corresponding to said one of said identified plurality of system interface elements and having an expected output according to a structure of said second computing system; and
        an executing component executing said system interface element test at said first computing system.

8. The system of claim 7, the logic further comprising:
    said seeking component further determining a dependency of said one of said identified plurality of system interface elements upon another of said identified plurality of system interface element and, in response, seeking in said repository a further system interface element test corresponding to said another of said identified plurality of system interface elements; and
    said executing component further adapted for executing said further system interface element test at said first computing system.

9. The system of claim 7, the logic further comprising:
    a creator component, responsive to a failure of said seeking to find a said system interface element test, creating a new test corresponding to said one of said identified plurality of system interface elements;
    said executing component further adapted for executing said new test at said second computing system; and
    a storing component for storing in said repository said new test and an expected output corresponding to an output of said executing said new test at said second computing system.

10. The system of claim 7, the logic further comprising:
a comparator component comparing an output of said executing said system interface element test at said first computing system with said expected output in said repository; and
an input eliciting component responsive to a mismatch between said output of said executing and said expected output, eliciting a user input.

11. The system of claim 10, wherein said user input selectively masks a portion of said output of said test.

12. The system of claim 7 wherein said first computing system is arranged to emulate operation of said second computing system.

13. A computer programming product, comprising:
a non-transitory computer readable storage medium; and
logic, stored on the computer readable storage medium for execution on a processor, for:
  identifying a plurality of system interface elements of a second computing system;
  determining an untested state at said first computing system of one of said identified plurality of system interface elements;
  determining there is no dependency of said one of said identified plurality of system interface elements upon any other of said identified plurality of system interface elements;
  in response to determining that there is no dependency, seeking in a repository a system interface element test corresponding to said one of said identified plurality of system interface elements and having an expected output according to a structure of said second computing system; and
  executing said system interface element test at said first computing system.

14. The computer programming product of claim 13, the logic further comprising logic for:
  determining there is a dependency and, in response, seeking in said repository a further system interface element test corresponding to another of said identified plurality of system interface elements; and
  executing said further system interface element test at said first computing system.

15. The computer programming product of claim 13, the logic further comprising logic for:
  responsive to a failure of said seeking to find a said system interface element test, creating a new test corresponding to said one of said identified plurality of system interface elements;
  executing said new test at said second computing system; and
  storing in said repository said new test and an expected output corresponding to an output of said executing said new test at said second computing system.

16. The computer programming product of claim 13, the logic further comprising logic for:
  comparing an output of said executing said system interface element test at said first computing system with said expected output in said repository; and
  responsive to a mismatch between said output of said executing and said expected output, eliciting a user input.

17. The computer programming product of claim 13, wherein said user input selectively masks a portion of said output of said test.

18. The computer programming product of claim 13, wherein said first computing system is arranged to emulate operation of said second computing system.

* * * * *